United States Patent
Parsons

(10) Patent No.: US 9,310,256 B2
(45) Date of Patent: Apr. 12, 2016

(54) PROCESS SENSOR WITH CONVECTIVE INCREASER

(75) Inventor: John Patrick Parsons, Afton, NY (US)

(73) Assignee: UNISON INDUSTRIES, LLC, Jacksonville, FL (US)

( * ) Notice: Subject to any disclaimer, the term of this patent is extended or adjusted under 35 U.S.C. 154(b) by 771 days.

(21) Appl. No.: 13/477,477

(22) Filed: May 22, 2012

(65) Prior Publication Data

US 2013/0315283 A1 Nov. 28, 2013

(51) Int. Cl.
*G01K 1/00* (2006.01)
*G01K 1/16* (2006.01)
*G01K 13/02* (2006.01)

(52) U.S. Cl.
CPC ............... *G01K 1/16* (2013.01); *G01K 13/028* (2013.01); *G01K 2013/024* (2013.01)

(58) Field of Classification Search
USPC .............................. 374/208, E1.021; 73/855
See application file for complete search history.

(56) References Cited

U.S. PATENT DOCUMENTS

| | | | | |
|---|---|---|---|---|
| 3,512,414 A * | 5/1970 | Rees | ............................... | 374/148 |
| 3,597,920 A * | 8/1971 | Wadman | ...................... | 60/39.52 |
| 6,122,678 A * | 9/2000 | Eckel et al. | ...................... | 710/15 |
| 6,390,670 B1 * | 5/2002 | Nimberger et al. | ........... | 374/142 |
| 6,827,485 B2 * | 12/2004 | Isebrand | ......................... | 374/141 |
| 7,328,623 B2 | 2/2008 | Slagle et al. | | |
| 7,845,222 B1 | 12/2010 | Goedel et al. | | |
| 8,303,173 B2 * | 11/2012 | Bradley et al. | ................. | 374/141 |
| 2004/0177683 A1 * | 9/2004 | Ice | .............................. | 73/170.02 |
| 2006/0056489 A1 * | 3/2006 | Bernard et al. | ................ | 374/208 |
| 2007/0195857 A1 * | 8/2007 | Krishnamurthy | ......... | G01K 1/16 374/148 |
| 2009/0110029 A1 * | 4/2009 | Bradley et al. | ................ | 374/208 |
| 2009/0154522 A1 | 6/2009 | Kulczyk | | |

* cited by examiner

*Primary Examiner* — Lisa Caputo
*Assistant Examiner* — Nasir U Ahmed
(74) *Attorney, Agent, or Firm* — GE Global Patent Operation; William S. Munnerlyn

(57) ABSTRACT

A convective heat transfer increaser feature for a process sensor. The feature may include at least annular fins, helical fins, knurling or other features which increase surface area. The features also increase turbulence which increases adherence of the turbulent flow to the process sensor.

14 Claims, 4 Drawing Sheets

PROCESS SENSOR WITH CONVECTIVE INCREASER

BACKGROUND

Present embodiments relate generally to gas turbine engines. More particularly, but not by way of limitation, present embodiments relate to apparatuses and methods for increasing convective heat transfer to improve reactance of a process sensor.

In turbine engines, air is pressurized in a compressor and mixed with fuel in a combustor for generating hot combustion gas which flow downstream through turbine stages. These turbine stages extract energy from the combustion gas. A high pressure turbine includes a first stage nozzle and a rotor assembly including a disk and a plurality of turbine blades. The high pressure turbine first receives the hot combustion gas from the combustor and includes a first stage stator nozzle that directs the combustion gas downstream through a row of high pressure turbine rotor blades extending radially outwardly from a first rotor disk. In a two stage turbine, a second stage stator nozzle is positioned downstream of the first stage blades followed in turn by a row of second stage turbine blades extending radially outwardly from a second rotor disk. The stator nozzles direct the hot combustion gas in a manner to maximize extraction at the adjacent downstream turbine blades.

The first and second rotor disks are joined to the compressor by a corresponding rotor shaft for powering the compressor during operation. These are typically referred to as the high pressure turbine. The turbine engine may include a number of stages of static airfoils, commonly referred to as vanes, interspaced in the engine axial direction between rotating airfoils commonly referred to as blades. A multi-stage low pressure turbine follows the two stage high pressure turbine and is typically joined by a second shaft to a fan disposed upstream from the compressor in a typical turbo fan aircraft engine configuration for powering an aircraft in flight.

As the combustion gas flows downstream through the turbine stages, energy is extracted therefrom and the pressure of the combustion gas is reduced. The combustion gas is used to power the compressor as well as a turbine output shaft for power and marine use or provide thrust in aviation usage. In this manner, fuel energy is converted to mechanical energy of the rotating shaft to power the compressor and supply compressed air needed to continue the process.

Process sensors are utilized by airplane avionics to control various operating conditions. For example, the temperature along with other characteristics are used to determine mass flow of the air entering the turbine engine. Such mass flow may be utilized by the engine control logic or avionics to determine fuel input to the engine as well. Therefore, it is desirable to improve the accuracy of the mass flow calculations in the engine control logic to improve engine fuel savings as well as determine the life spans of critical engine components.

One issue with process sensors is response time or reactance. For example, as related to temperature, air entering the jet engines can change temperature very rapidly. However, many air temperature sensors have low reactance, and accordingly the temperature sensor may not detect the temperature change fast enough. Thus improvement of the response or reactance of the air temperature sensor may identify hot and cold streaks faster which allow the engine control logic to adjust appropriately and in a timely manner.

As may be seen from the foregoing, there is a need to optimize convective response characteristics of process sensors. Additionally, there is a need to improve reactance of the process sensor so that engine efficiency and performance of the turbine engine may be improved as well. It would be desirable to improve performance of the gas turbine engine at various operating conditions.

SUMMARY

Some embodiments of the present disclosure involves a convective heat transfer increaser feature for a process sensor. The feature may include at least annular fins, helical fins, knurling or other features which increase surface area. The features also increase turbulence which increases adherence of the turbulent flow to the process sensor. The features also improve reactance of the process sensor and allow for faster more accurate response to the rapid temperature changes.

According to some embodiments, a process sensor assembly comprises a temperature detector, a housing structure wherein the temperature detector is disposed, a plurality of fins disposed on an outside of the housing, wherein the fins increase surface area of the housing increasing convective heat transfer.

All of the above outlined features are to be understood as exemplary only and many more features and objectives of the sensor may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of this disclosure, and the manner of attaining them, will become more apparent and the process sensor will be better understood by reference to the following description of embodiments taken in conjunction with the accompanying drawings, wherein.

DETAILED DESCRIPTION

Figure 1:
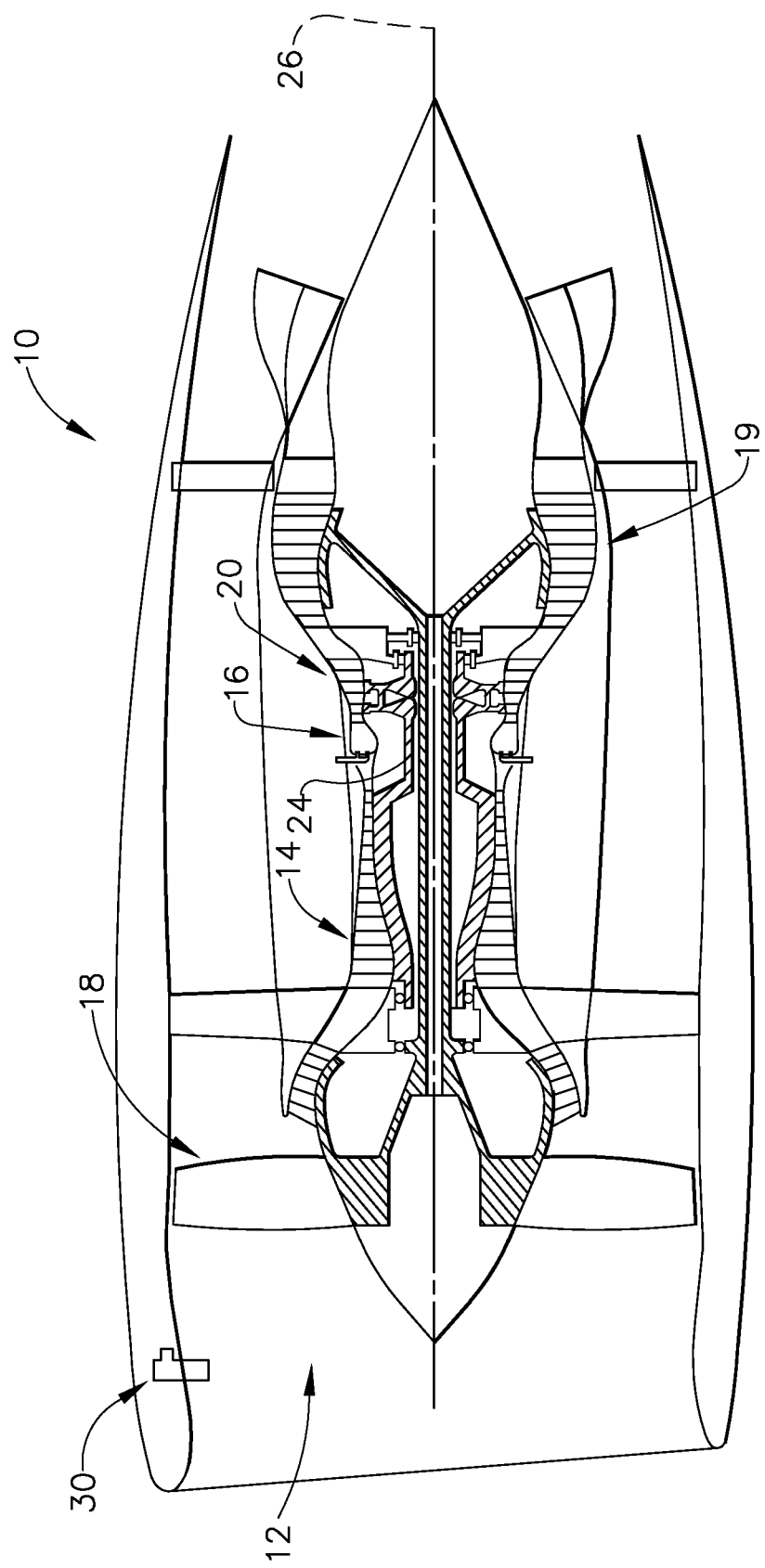
FIG. 1 is a side section schematic view of an exemplary turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Present embodiments provide a process sensor which improves reactance. For example, a total air temperature sensor may be utilized in a housing and may include a plurality of features to increase turbulence of air into the sensor. The increase in turbulence results in increased convective heat transfer to the process sensor. This will improve transient sensor performance or reactance of the sensor as well as reducing conduction error and excitation error out of the sensor. Although total air temperature sensors are described herein as one type of process sensor, various sensor types may be utilized. Additionally, exemplary embodiments reference inlet temperatures for the engine. However the structures described herein may be utilized at alternate locations including but not limited to exhaust gas, by-pass air and flame detection, for example. Alternative sensors may utilize the features described herein in order to increase turbulence and adherence of air to the process sensor to provide the desired results.

The terms fore and aft are used with respect to the engine axis and generally mean toward the front of the turbine engine or the rear of the turbine engine in the direction of the engine axis, respectively.

Referring now to FIGS. 1-6, various embodiments of a process sensor with a convective increaser are depicted. The sensor includes a convective increaser feature in order to improve reactance of the sensor and reduce errors in computer control logic which may occur due to rapid changes in temperature or other characteristics. Engine control logic may be represented in various forms. For purpose of this disclosure, the control logic may be operated by a processor which operates software or firmware, for example. The term processor, is used herein, refers to central processing units, microprocessors, microcontrollers, reduced instruction set circuits (RISC), application specific integrated circuits (ASIC), logic circuits, and any other circuit or processor capable of executing the functions described herein.

As used herein, the term "software" and "firmware" are interchangeable including any computer programs stored in memory for execution by processor, including RAM memory, ROM memory, EPROM memory, EEPROM memory and non-volatile RAM (NVRAM) memory. The memory types are exemplary only and thus are not limiting as to the types of memory useful for storage in the computer program. As will be appreciated on the foregoing specification, the above described embodiments of the disclosure may be implemented using computer programming or engineering techniques including computer software, phoneware, hardware, or any combination of subset thereof, wherein the technical effect is for sensing a process parameter using a process sensor where slow response time may introduce errors into the value of the sensing parameter in input to the processor or control logic for the avionics system. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed "hard" drive diskette, optical disk, magnetic tape, semi-conductor memory such as read-only memory (ROM) and that and/or any transmitting/receiving media such as the Internet or other communication network. The article of manufacture contains a computer code. The computer code may be made and/or used by executing the code directly from one medium, by copying the code from one medium to another medium or by transmitting the code of the network.

Referring initially to FIG. 1, a schematic side section view of a gas turbine engine 10 is shown having an engine inlet end 12, a compressor 14, a combustor 16 and a multi-stage high pressure turbine 20. The gas turbine 10 may be used for aviation, power generation, industrial, marine or the like. Depending on the usage, the engine inlet end 12 may alternatively contain multi-stage compressors rather than a fan. The gas turbine 10 is axis-symmetrical about engine axis 26 or shaft 24 so that various engine components rotate thereabout. In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design.

The axis-symmetrical shaft 24 extends through the through the turbine engine 10, from the forward end to an aft end. The shaft 24 is supported by bearings along its length. The shaft 24 may be hollow to allow rotation of a low pressure turbine shaft 28 therein. Both shafts 24, 28 may rotate about the centerline 26 of the engine. During operation the shafts 24, 28 rotate along with other structures connected to the shafts such as the rotor assemblies of the turbine 20 and compressor 14 in order to create power or thrust depending on the area of use, for example power, industrial or aviation.

Referring still to FIG. 1, the inlet 12 includes a turbofan 18 which has a plurality of blades. The turbofan 18 is connected by shaft 28 to the low pressure turbine 19 and creates thrust for the turbine engine 10. Forward of the turbofan 18 is a process sensor housing assembly 30 which may include, as a non-limiting example, a temperature sensor therein which provides an air temperature, or other process reading, for the air coming into the inlet 12. This process reading may be inputted to the computer control logic for controlling engine operating conditions.

One skilled in the art will understand that turbulent air transfers heat more readily to adjacent surfaces than laminar air flow. Generally speaking, the temperature sensor assembly, according to at least one exemplary embodiment, may be a cylindrical shaped structure. The air flow passing around the cylindrical temperature sensor assembly detaches from the temperature sensor when the flow is more laminar in nature. This utilizes less of the surface area of the temperature sensor assembly than available to obtain a temperature reading which may be utilized by the control logic of the airplane avionics. Additionally, it provides a smaller amount of surface area to which air temperature may be transferred by way of connected heat transfer. By increasing turbulence in the area of the sensor, the airflow is able to improve the heat transfer and increase attachment to the convective increaser feature. Accordingly this increases function of the process sensor assembly. By increasing the reactance of the temperature sensor, rapid temperature changes are more readily detectable. This will increase engine efficiency, performance and life span of the turbine engine.

Figure 2:
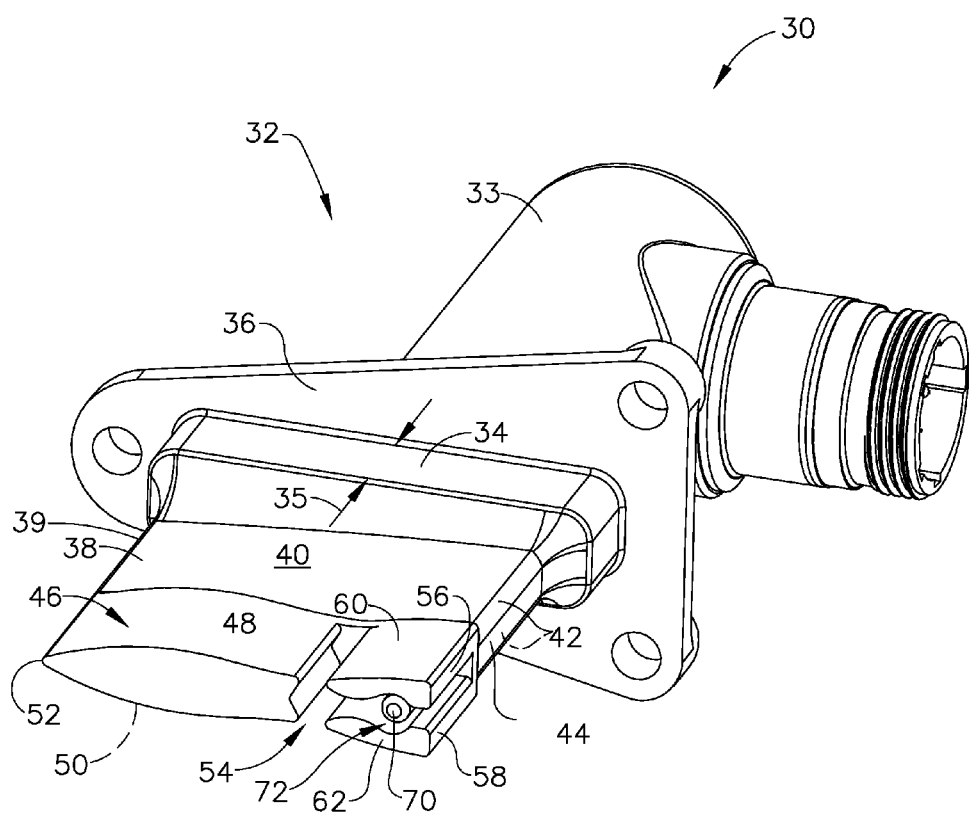
FIG. 2 is an isometric view of an exemplary process sensor assembly.

Referring now to FIG. 2, an isometric view of the process sensor housing assembly 30 includes a housing 32 having a base 34 of a height 35 which is related to a thickness of a sidewall of a fluid conveying member such as, but not limited to, a gas turbine engine facing. The upper end of the housing 32 includes a connection area 33 which facilitates connection of electrical conduits between the process sensor assembly 70 and, for example, but not limited to, an engine control logic for the avionics system. The housing 32 further includes a pedestal 38 which is generally triangular in cross sections.

One side 40 of the triangle is depicted extending between a leading edge 39 and a trailing edge defined by multiple surfaces 42, 44. Air passes over the pedestal 38 at the leading edge passing to the trailing surfaces 42, 44. One goal of the housing 32 is too slow air speed to measure total air temperature, according to the instant embodiment. However, when air velocity is too slow, response time of the temperature sensor decreases. Sensor tests involve change in temperature within acceptable time frames.

Beneath the pedestal 38 is an airfoil 46 having a opposed surfaces 48, 50 extending from a leading edge 52. The airfoil 46 includes a gap 54 and extends further defining shields 60, 62. The shields 60, 62 include trailing surfaces 56, 58.

Within the shields 60, 62 is a process sensor assembly 70 which, according to the exemplary embodiment, is a temperature sensor or detector. The temperature sensor may include various types of detector for sensing temperature, for example. The temperature sensor assembly 70 receives air which moves along the airfoil sides 48, 50 and into the gap 54. The air passes around the sensor assembly 70 and exits between the trailing surfaces 56, 58.

The process sensor assembly 70 extends from the pedestal 38 between the shields 60, 62. A flow channel 72 is created between the shields 60, 62 and the process sensor assembly 70 wherein air flows about the process sensor assembly 70 and transfers heat thereto.

Figure 3:
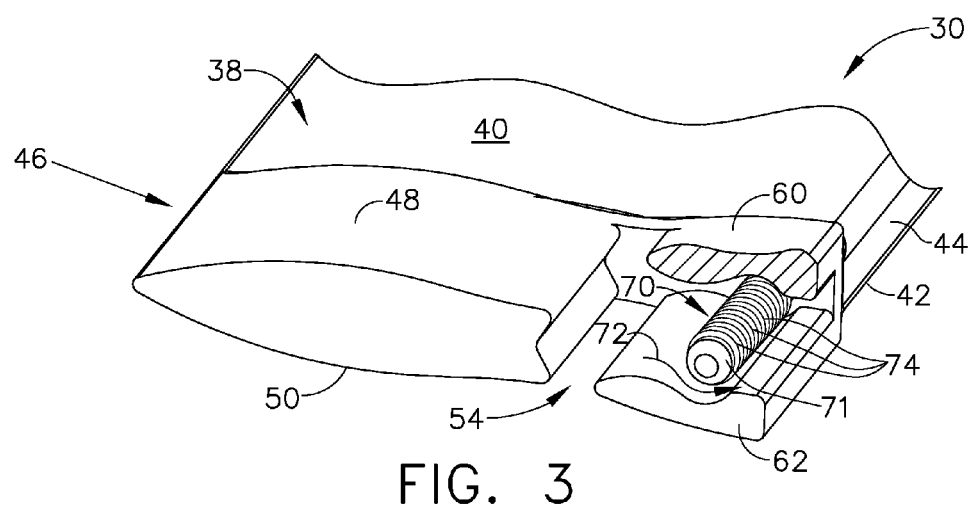
FIG. 3 is a detail isometric view of the exemplary housing with a portion removed to depict an exemplary sensor.

Referring now to FIG. 3, a detail isometric view of the lower portion of the sensor housing assembly 30 is depicted. The pedestal 38 and airfoil 46 are shown. Similarly a portion of shield 60 is cut away to depict the sensor assembly 70 positioned between shields 60, 62. One flow channel or path 72 is shown between the process sensor assembly 70 and shield 62. The process sensor according to exemplary embodiments may be formed of metal from the inconel family which are generally nickel based alloys, although other materials may be used. The sensor assembly 70 to may include a housing 71 with a detector 73 (FIG. 4) within a housing. A potting material may be disposed within the housing 71 to seat the detector 73. The housing 71 may be formed in various shapes and according to one non-limiting embodiment is cylindrical in shape. The detector 73 may take various forms and according to one embodiment is a resistive temperature detector, for example. However, alternative embodiments include, but are not limited to, thermocouples, thermistors or pyrometers.

The process sensor assembly 70, according to one exemplary embodiment is a temperature sensor. The sensor assembly 70 includes a plurality of annular fins 74. The fins 74 create disturbances in airflow resulting in turbulence. The turbulence causes the airflow to adhere to the sensor for longer arcuate distances. The fins 74 also provide increased surface area. Both of these characteristics improve reactance of the sensor assembly 70.

Figure 4:
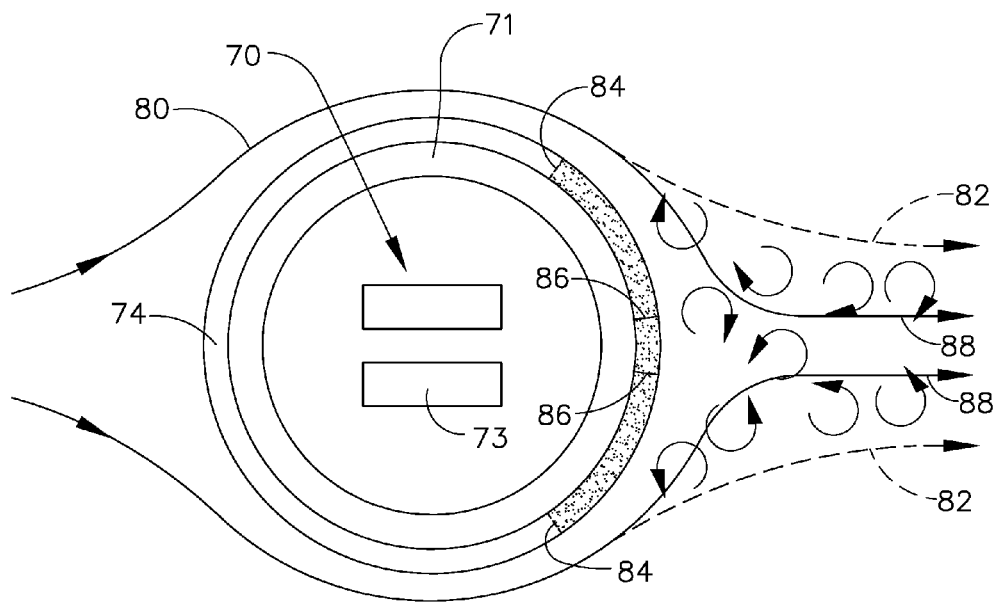
FIG. 4 is a lower schematic view of the exemplary process sensor of FIG. 3.

Referring to FIG. 4, an upward view of the sensor assembly 70 and annular fin 74 is depicted. The sensor assembly 70 is shown with an airflow 80. As the flow 80 passes along the annular fins 74 extending from the sensor assembly 70, the flow conforms to the shape of the sensor assembly 70.

The fins 74 may be at zero angle relative to the flow or may be up to 90° relative to the flow path. Alternatively, the flow may be 0 to 90 to the axis of housing 71. The fins 74 may be continuous or discontinuous in structure. Along the aft side of the sensor assembly 70 two pairs of lines are depicted. One pair of lines is shown in broken line form and the second set of lines is shown in solid line form. The broken line 82 corresponds to the broken line 84 which depicts a departure point of the air flow 80 from the surfaces of the sensor assembly 70. This represents the departure point of the air flow 80 in the prior art devices which do not have any convective increaser feature and the figure depicts the larger surface area wherein air flow 80 does not engage the rear arcuate section of the process sensor assembly 70. Convective heat transfer (Q) is related to heat transfer coefficient (h), surface area (a) and change in temperature $\Delta t$ by the following equation: $Q=h(a) \Delta t$. Thus convective heat transfer is increased in part by the increased surface area of fins 74. Additionally, an unexpected benefit is that the convective factor (h) is increased due to turbulence of airflow over the fins 74.

FIG. 4 further depicts followed air flow lines 88 which correspond to solid lines 86. The solid lines 86 depict the additional attachment of turbulent air flow to the angular fins 74 as compared with the broken lines 84. This provides a visual representation of the additional attachment which therefore provides increased convective heat transfer around this angular distance between lines 84 and 86 which is depicted in stippled surface. Additionally, the distance between the solid lines 88 is considerably smaller than the distance between broken lines 82 which is again depicting the improved attachment of air to the annular fin 74 and which improves convective heat transfer. With this improved detachment of air flow, the sensor is able to provide improved response especially in areas of rapid temperature increase or decrease which normally take longer to detect in prior art sensors.

Figure 5:
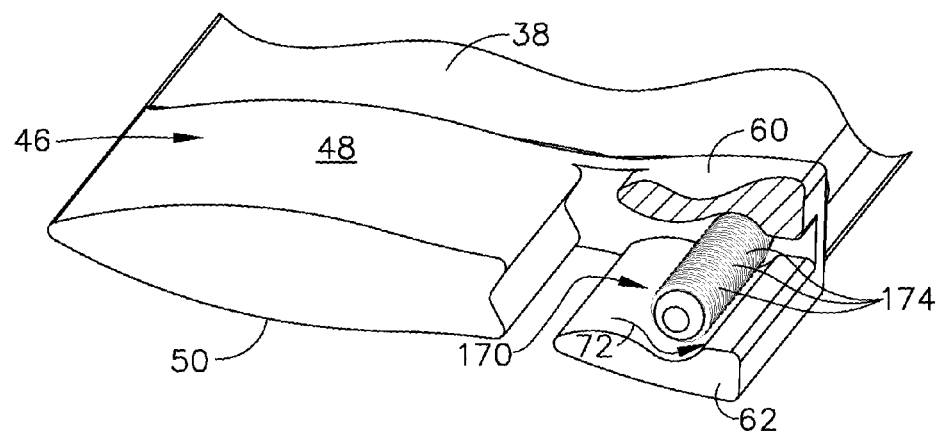
FIG. 5 is a detail isometric view of the exemplary housing with a portion removed to depict a second exemplary sensor.

Referring now to FIG. 5, an alternative embodiment of a process sensor assembly 170 is depicted. The process sensor assembly 170 includes a plurality of helical fins 174 disposed along the axial length of the process sensor assembly 170. The fins 174 as previously described create a turbulence causing increased film attachment of air flow 80 along the aft side of the sensor assembly 170.

Figure 6:
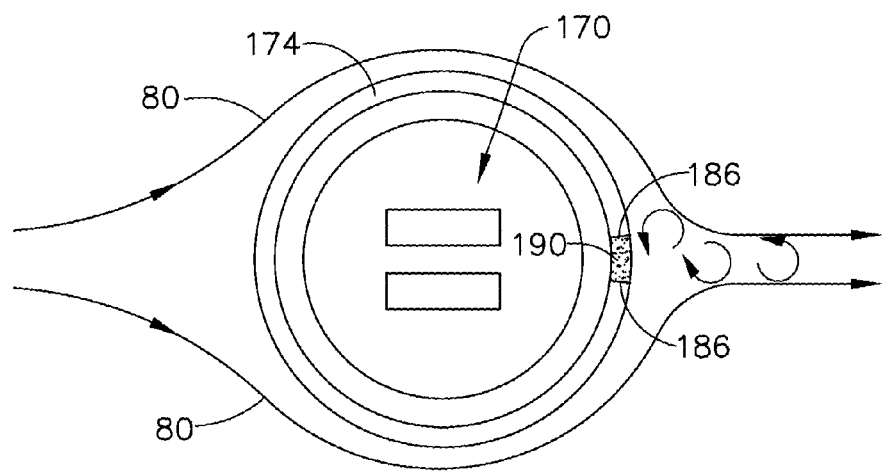
FIG. 6 is a lower schematic view of the exemplary process sensor of FIG. 5.

Referring to FIG. 6, the flow 80 is shown in solid lines passing the process sensor assembly 170 having the helical fins 174. The figure depicts a stippled area 190 positioned between solid lines 186. The lines represent the arcuate distance up to which is engaged by the air flow 80. As compared with the broken lines 84 of FIG. 4, the helical fins 174 also increase the flow attachment of the air flow 80 along the sensor assembly 170. This increases the convective heat transfer and provides a faster and a more accurate response to the sensor assembly 170.

Additional alternatives may include knurling the fins 74 or 174. This increases the surface area and/or turbulence providing the improvements described previously.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Furthermore, references to one embodiment are not intended to be interpreted as excluding the existence of additional embodiments that may also incorporate the recited feature.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What I claim is:

1. A process sensor assembly, comprising:
   a temperature detector;
   a temperature detector housing structure wherein said temperature detector is disposed;
   a potting material within said housing; and
   a plurality of helical fins disposed on an outside of said temperature detector housing structure,
   wherein said fins create turbulence causing increased film attachment in an air flow along a side of the temperature detector, and increase surface area of said temperature detector housing structure, increasing convective heat transfer.

2. The process sensor assembly of claim 1 wherein said temperature detector housing structure is cylindrical.

3. The process sensor assembly of claim 1 wherein said fins are formed of a nickel-based alloy.

4. The process sensor assembly of claim 1 wherein said plurality of fins create turbulence in an airflow adjacent said fins.

5. The process sensor assembly of claim 4 wherein said turbulence causes said airflow to adhere to said plurality of fins.

6. The process sensor assembly of claim 1, said temperature detector being a resistive temperature detector.

7. A temperature sensor assembly, comprising:
   a sensor housing capable of insertion in an airflow;
   a temperature detector disposed within said sensor housing;
   a potting material within said sensor housing; and
   an exterior of said sensor housing having a fin at an angle of 0 to about 90 degrees relative to said airflow, wherein the fin includes at least one continuous helical fin that creates turbulence in the airflow causing increased film attachment on at least one side of the sensor housing.

8. The temperature sensor assembly of claim 7 wherein said fin is a plurality of fins.

9. The temperature sensor assembly of claim 7 wherein said fins increases turbulence in said airflow at said housing.

10. The temperature sensor assembly of claim 9 wherein said increase in turbulence results in an increase of convective heat transfer properties.

11. The temperature sensor assembly of claim 7 wherein said fin is integrally formed with said sensor housing.

12. A process sensor assembly, comprising:
    a processor sensor assembly housing having a temperature detector positioned therein; and
    a plurality of helical fins generally symmetrically disposed about said housing, and disposed at an angle to an airflow of less than 60 degrees, wherein said fins increase convective heat transfer by creating turbulence in the airflow causing increased film attachment along a side of the processor sensor housing and increasing the surface area of said temperature detector housing structure.

13. The process sensor assembly of claim 12, said plurality of fins being discontinuous.

14. The process sensor assembly of claim 12, said plurality of fins being continuous.

* * * * *